(12) United States Patent
Davydov et al.

(10) Patent No.: US 10,038,484 B2
(45) Date of Patent: Jul. 31, 2018

(54) SYSTEMS AND METHODS FOR ENHANCED MBMS WITH MIMO SUPPORT

(71) Applicant: INTEL CORPORATION, Santa Clara, CA (US)

(72) Inventors: Alexei Davydov, Nizhny Novgorod (RU); Vadim Sergeyev, Nizhny Novgorod (RU); Gregory V. Morozov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 266 days.

(21) Appl. No.: 14/865,238

(22) Filed: Sep. 25, 2015

(65) Prior Publication Data
US 2016/0254920 A1 Sep. 1, 2016

Related U.S. Application Data

(60) Provisional application No. 62/126,192, filed on Feb. 27, 2015.

(51) Int. Cl.
*H04B 7/04* (2017.01)
*H04W 28/18* (2009.01)
(Continued)

(52) U.S. Cl.
CPC ......... *H04B 7/0473* (2013.01); *H04B 7/0413* (2013.01); *H04B 7/0495* (2013.01);
(Continued)

(58) Field of Classification Search
CPC ..... H04W 52/20; H04W 28/16; H04W 28/18; H04W 28/22; H04W 28/26; H04L 1/0048;
(Continued)

(56) References Cited

U.S. PATENT DOCUMENTS

| | | | | |
|---|---|---|---|---|
| 2011/0249590 A1* | 10/2011 | Blankenship | ........... | H04L 1/007 370/252 |
| 2014/0126551 A1* | 5/2014 | Nammi | ................. | H04L 1/0025 370/336 |
| 2018/0020426 A1* | 1/2018 | Yi | ........................... | H04W 4/70 |

FOREIGN PATENT DOCUMENTS

| | | |
|---|---|---|
| EP | 2685639 A1 | 1/2014 |
| EP | 2988562 A1 | 2/2016 |
| WO | 2014169824 A1 | 10/2014 |

OTHER PUBLICATIONS

PCT/US2016/012350, International Search Report and Written Opinion, dated Jul. 13, 2016, 20 pages.
(Continued)

*Primary Examiner* — Ashley Shivers
(74) *Attorney, Agent, or Firm* — Stoel Rives LLP (57) ABSTRACT

Systems and methods use multiple spatial layers for physical multicast channel transmission. Certain embodiments introduce additional multimedia broadcast multicast service reference signals that support more than one antenna ports for multicast broadcast single frequency network transmissions. To reduce channel estimation complexity due to the multicast broadcast single frequency network reference signal design, resource elements of the multicast broadcast single frequency network reference signals may have a nested structure. To assist modulation and coding scheme selection, a user according to certain embodiments also independently reports block error rate measurements for each spatial layer of the multicast channel.

26 Claims, 7 Drawing Sheets

(51) Int. Cl.
  *H04W 28/22* (2009.01)
  *H04B 7/0456* (2017.01)
  *H04W 28/26* (2009.01)
  *H04B 7/0495* (2017.01)
  *H04B 7/0413* (2017.01)
  *H04L 1/00* (2006.01)
  *H04L 12/18* (2006.01)
  *H04B 7/022* (2017.01)

(52) U.S. Cl.
  CPC .......... *H04L 1/0027* (2013.01); *H04L 12/189* (2013.01); *H04W 28/18* (2013.01); *H04W 28/22* (2013.01); *H04W 28/26* (2013.01); *H04B 7/022* (2013.01)

(58) Field of Classification Search
  CPC ..... H04L 1/203; H04B 7/0413; H04B 7/0456; H04B 7/024; H04B 7/0452; H04B 7/0495; H04B 7/0473
  See application file for complete search history.

(56) References Cited

OTHER PUBLICATIONS

Ericsson, "On radio measurements for further MBMS support", R1-135667, 3GPP TSG-RAN WG1 #75, San Francisco, CA, USA, Agenda Item 6.2.5, Nov. 11-15, 2013, 3 pages.
PCT/US2016/012350, Invitation to Pay Additional Fees and Partial Search Report, dated May 3, 2016, 9 pages.

\* cited by examiner

SYSTEMS AND METHODS FOR ENHANCED MBMS WITH MIMO SUPPORT

RELATED APPLICATION

This application claims the benefit under 35 U.S.C. § 119(e) of U.S. Provisional Application No. 62/126,192, filed Feb. 27, 2015, which is hereby incorporated by reference herein in its entirety.

TECHNICAL FIELD

This disclosure relates to multimedia broadcast multicast service (MBMS) in wireless communication networks. Specifically, this disclosure relates to using multiple spatial layers for physical multicast channel (PMCH) transmissions.

BACKGROUND INFORMATION

Wireless mobile communication technology uses various standards and protocols to transmit data between a base station and a mobile communication device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an UTRAN or E-UTRAN, which communicates with the mobile communication device, known as user equipment (UE). A downlink (or DL) transmission can be a communication from the base station (or eNB) to the mobile communication device (or UE), and an uplink (or UL) transmission can be a communication from the mobile communication device to the base station.

In LTE networks, base stations may use spatial multiplexing to increase data rates. Specifically, spatial multiplexing is a transmit scheme that allows a base station having multiple transmit antennas to simultaneously transmit independent and separately encoded data streams from each of the transmit antennas using the same transmit resources. For example, using spatial multiplexing, a base station that uses orthogonal frequency division multiplexing (OFDM) may transmit independent and separately encoded data streams from each of multiple transmit antennas using the same sub-carriers in the same OFDM symbol periods.

DETAILED DESCRIPTION

Embodiments disclosed herein use multiple spatial layers for PMCH transmission. Certain such embodiments introduce additional MBMS reference signals that support more than one antenna port for multicast broadcast single frequency network (MBSFN) transmissions. To reduce channel estimation complexity due to the MBSFN reference signal design, resource elements of the MBSFN reference signals may have a nested structure. That is to say, in some embodiments, the occupied resource elements of each antenna port for the MBSFN reference signals are a subset of the reference elements of the unicast MBSFN reference signals (e.g., for antenna port 4). To assist modulation and coding scheme (MCS) selection, a UE according to certain embodiments also independently reports block error rate (BLER) measurements for each spatial layer of the multicast channel (MCH) from the UE to the eNB or to a multicast coordination entity (MCE) to indicate reliability of the MBSFN transmission on each spatial layer. Systems and methods for MBSFN transmission using multiple spatial layers may be used to improve the spectral efficiency of MBMS transmissions.

LTE systems provide, in addition to unicast transmissions, support of MBMS services. The MBMS in LTE-Advanced (LTE-A) is typically provided in a synchronized network by the simultaneous transmission of the same information from multiple transmission points or cells using the same carrier frequency in an MBSFN area.

Figure 1:
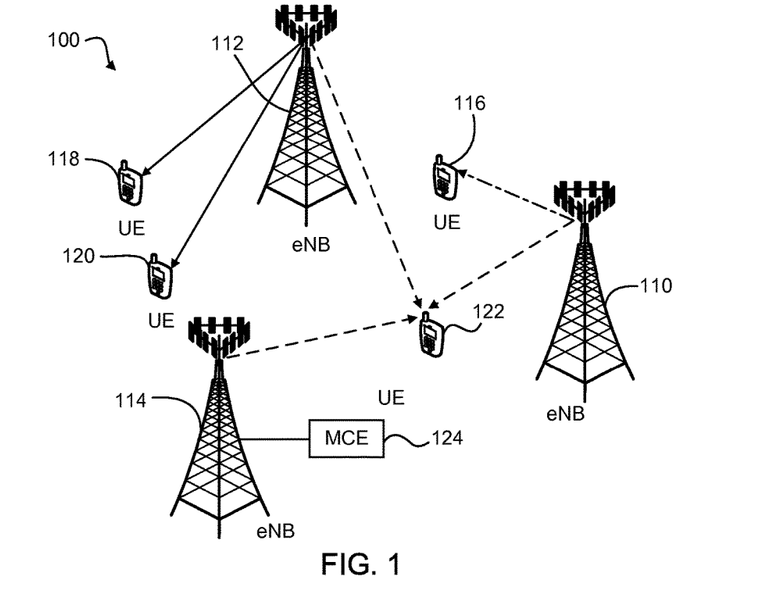
FIG. 1 is a block diagram of a wireless communication system configured to provide MBMS according to certain example embodiments.

For example, FIG. 1 is a block diagram of a wireless communication system 100 configured to provide MBMS according to certain example embodiments. The wireless communication system 100 includes a first eNB 110, a second eNB 112, and a third eNB 114 that each include multiple antennas (e.g., a sector antenna array) to provide multiple-input multiple-output (MIMO) communication channels that increase transmission capacity and quality. The first eNB 110 provides a unicast transmission to a UE 116 within its cell coverage area. The unicast transmission may be over two or more MIMO layers from the first eNB 110 to the UE 116. As used herein, MIMO layers may also be referred to as spatial layers. The second eNB 112 provides a multicast transmission to UEs 118, 120. The multicast transmission may be over two or more MIMO layers from the second eNB 112 to each of the UE 118 and the UE 120.

In the example shown in FIG. 1, a UE 122 is in an MBSFN area serviced by the first eNB 110, the second eNB 112, and the third eNB 114. Although not shown, other UEs may also receive the MBMS transmissions within the MBSFN area. In certain embodiments, each of the eNBs 110, 112, 114 provides MBMS transmissions to the UE 122 (and other UEs) over two or more MIMO layers. Because the same data transmission in MBSFN is performed by multiple cells or transmission points (i.e., the eNBs 110, 112, 114), the resource allocation and transport block format (e.g., modulation and coding scheme (MCS) and transport block size (TBS)) are not changed dynamically by one of the eNBs 110, 112, 114, and instead are decided by an MCE 124 on a long-term basis. As discussed below, the UE 122 may provide one or more MCH BLER reports (e.g., an MCH BLER report for each MIMO layer) to the MCE 124 to assist with TBS and/or MCS selection. For purposes of discussion, certain embodiments herein refer to the example shown for UE 122. However, the embodiments may also apply to the other UEs 116, 118, 120, the examples shown in FIG. 1, and/or other scenarios not shown in FIG. 1.

The MCE 124 may be implemented by one or more servers or devices in an evolved packet core (EPC) of the wireless communication system 100. Persons skilled in the art will recognize from the disclosure herein that the some or all of the functions of the MCE 124 described herein, in other embodiments, may be performed by one or more other entities within the EPC and/or by one or more of the eNBs 110, 112, 114. Further, for simplicity, the embodiment shown in FIG. 1 illustrates the MCE 124 in communication only with the third eNB 114. In such an embodiment, messages to and from the MCE 124 may be communicated between the eNBs 110, 112, 114 (e.g., through an X2 interface). In other embodiments, however, the MCE 124 may communicate directly with any or all of the eNBs 110, 112, 114.

In a physical layer of the LTE protocol, the subframes used for MBMS transmission are referred to as MBSFN subframes and are configured to the UE 122 using higher layer (e.g., radio resource control (RRC)) signaling. Generally, the PMCH transmission parameters are configured via higher layer signaling using a PMCH-InfoList information element that includes an indication of the MCS used for PMCH transmission by a dataMCS-r12 parameter, as shown in the following example pseudo code:

```
PMCH-InfoList
-- ASN1START
PMCH-InfoList-r9 ::=
    SEQUENCE (SIZE (0..maxPMCH-PerMBSFN)) OF PMCH-Info-r9
PMCH-InfoListExt-r12 ::=
    SEQUENCE (SIZE (0..maxPMCH-PerMBSFN)) OF
    PMCH-InfoExt-r12
PMCH-InfoExt-r12 ::=          SEQUENCE {
    pmch-Config-r12               PMCH-Config-r12,
    mbms-SessionInfoList-r12      MBMS-SessionInfoList-r9,
    ...
}
...
```

```
PMCH-Config-r12 ::=           SEQUENCE {
    sf-AllocEnd-r12               INTEGER (0..1535),
    dataMCS-r12                   CHOICE {
        t1-r12                        INTEGER (0..28),
        t2-r12                        INTEGER (0..27)
    },
    mch-SchedulingPeriod-r12      ENUMERATED {
        rf4, rf8, rf16, rf32, rf64, rf128,
        rf256, rf512, rf1024},
    ...
}
-- ASN1STOP
```

The information element PMCH-InfoList above specifies all PMCHs of an MBSFN area. The information provided for an individual PMCH includes the configuration parameters of the sessions that are carried by the concerned PMCH. In the PMCH-Config-r12 information element, the dataMCS-r12 parameter includes t1 that can be set from 0 to 28 to indicate the MCS, or to point to a location in an MCS table. If only t1 is used, then a conventional MCS table is used, e.g., for quadrature phase shift keying (QPSK), 16 quadrature amplitude modulation (QAM), and 64 QAM. If t2 is used, it indicates (or points to a table entry for) parameters for 256 QAM.

Figure 2A:
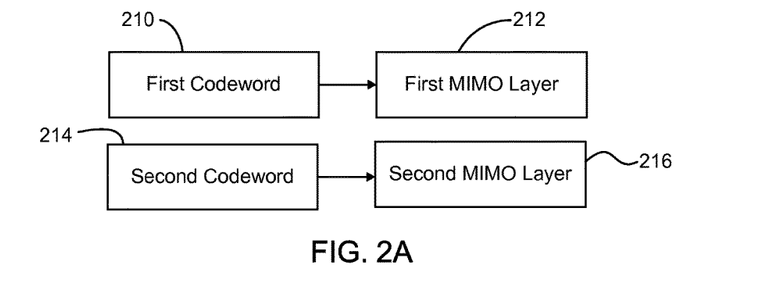
FIG. 2A is a block diagram illustrating a first codeword mapped to a first layer and a second codeword mapped to a second layer according to one embodiment.

In certain embodiments, the eNBs 110, 112, 114 are configured to transmit PMCH using at least two MIMO layers in MBSFN subframes. The number of MIMO layers used for MBSFN transmission, as well as the TBS and the MCS per each MIMO layer are signaled to the UE 122 using RRC signaling. In one embodiment, a different codeword is mapped to each MIMO layer. For example, FIG. 2A is a block diagram illustrating a first codeword 210 mapped to a first MIMO layer 212 and a second codeword 214 mapped to a second MIMO layer 216. In such an embodiment, the PMCH-Config-r12 information element shown above may be extended to include at least one additional dataMCS-r12 parameter indicating the MCS used for transmission on the additional MIMO layer (e.g. the second MIMO layer 216) of the PMCH. An example of a modified PMCH-Config-r12 is shown below (with "r12" changed to "r13" to show a new version), where the additional dataMCS2-r13 parameter is included to indicate the MCS on the second MIMO layer 216. The UE 122 determines the total number of MIMO layers 212, 216 used for PMCH transmission in this embodiment based on the total number of dataMCS-r13 parameters included in the PMCH-Config-r13.

Modified PMCH-Config information element:

```
PMCH-Config-r13 ::=           SEQUENCE {
    sf-AllocEnd-r13               INTEGER (0..1535),
    dataMCS-r13                   CHOICE {
        t1-r13                        INTEGER (0..28),
        t2-r13                        INTEGER (0..27)
    },
    dataMCS2-r13                  CHOICE {
        t1-r13                        INTEGER (0..28),
        t2-r13                        INTEGER (0..27)
    }
    mch-SchedulingPeriod-r13      ENUMERATED {
        rf4, rf8, rf16, rf32, rf64, rf128, rf256,
        rf512, rf1024},
    ...
}
```

Figure 2B:
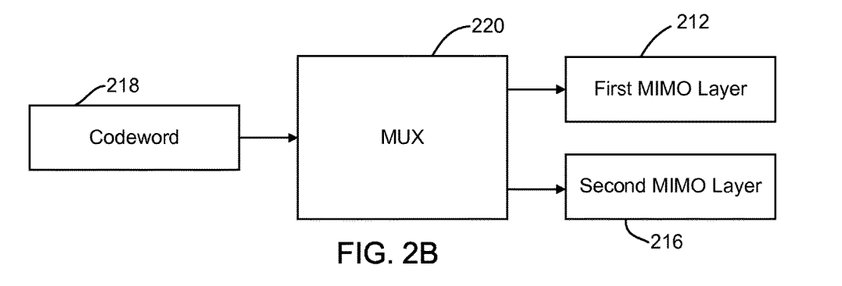
FIG. 2B is a block diagram illustrating a single codeword that is provided to both a first layer and a second layer according to one embodiment.

In another embodiment, more than one MIMO layer transmission for PMCH may be supported using one codeword. For example, FIG. 2B is a block diagram illustrating a single codeword 218 that is provided to both the first MIMO layer 212 and the second MIMO layer 216 through a multiplexer (MUX) 220. In such an embodiment, the total number of MIMO layers 212, 216 used for PMCH transmission may be indicated to the UE 122 via higher layer signaling by using a new field or parameter in the PMCH-Config information element. For example, a dataNumLayers-r13 field may indicate the total number of MIMO layers, as shown below.

Modified PMCH-Config information element:

```
PMCH-Config-r13 ::=         SEQUENCE {
    sf-AllocEnd-r13             INTEGER (0..1535),
    dataNumLayers-r13           (1..4),
    dataMCS-r13                 CHOICE {
        t1-r13                      INTEGER (0..28),
        t2-r13                      INTEGER (0..27)
    },
    mch-SchedulingPeriod-r13    ENUMERATED {
                                    rf4, rf8, rf16, rf32, rf64, rf128, rf256,
                                    rf512, rf1024},
    ...
}
```

As mentioned above, the subframes used for MBMS transmission are referred as MBSFN subframes and are configured to the UE 122 using higher layer (RRC) signaling. Each MBSFN subframe comprises a control region with one or two OFDM symbols and an MBSFN region occupying the remaining OFDM symbols of the downlink subframe. The control region of the MBMS subframe may include physical layer control channels that are transmitted in a unicast manner using cell specific reference signal (CRS) antenna ports (e.g., antenna ports 0-3). The MBSFN region of the MBMS subframe is transmitted in multicast manner using MBSFN reference signals (e.g., using antenna port 4).

Figure 3:
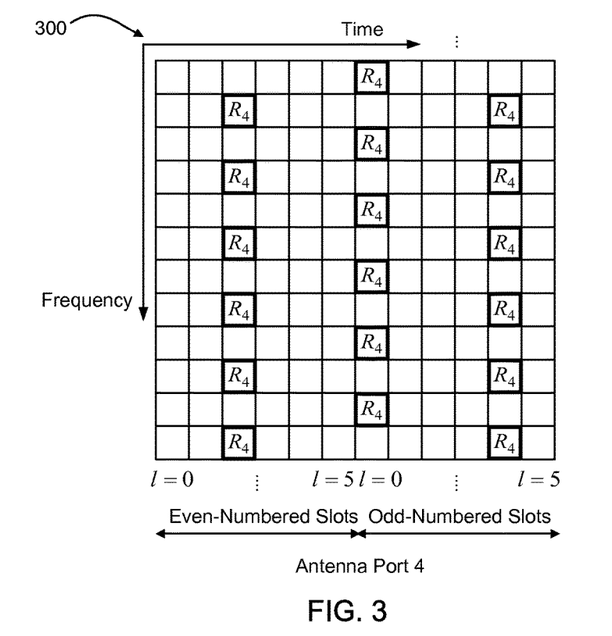
FIG. 3 illustrates a mapping of reference signals in a resource block corresponding to a single antenna port according to one embodiment.

For example, FIG. 3 illustrates a mapping of MBSFN reference signals in a resource block 300 corresponding to a single antenna port (e.g., antenna port 4) according to one embodiment. This example corresponds to using an extended cyclic prefix and subcarrier spacing $\Delta f=15$ kHz. Each square in the resource block 300, and other resource blocks shown herein, comprises a resource element. The resource elements vary from one another in frequency (e.g., subcarriers in the vertical direction) and time (e.g., OFDM/SC-FDMA symbols in the horizontal direction). In FIG. 3, "$R_4$" indicates the resource blocks assigned to MBSFN references signals for antenna port 4. The UE 122 uses the MBSFN reference signals $R_4$ to perform channel estimation. After estimation of the channel, the UE 122 may demodulate the MBMS signals from the eNBs 110, 112, 114. Each of the eNBs 110, 112, 114 may jointly transmit the MBSFN reference signals $R_4$. In the current LTE specification, multiple antennas are not supported for MBMS and, as shown in the example of FIG. 3, there is only a single antenna port used to transmit the MBSFN reference signals $R_4$. Thus, only one layer may be used for MBMS traffic.

In other embodiments, however, additional MBMS reference signals support more than one antenna port for PMCH. In certain such embodiments, to reduce the channel estimation complexity due to a new MBSFN reference signal design, the resource elements of the MBSFN reference signals have a nested structure, i.e., the occupied resource elements of each antenna port for the MBSFN reference signals are a subset of the resource elements of the MBSFN reference signals $R_4$ used for a single port (antenna port 4). Thus, existing channel estimation filters may continue to be used.

Figure 4:
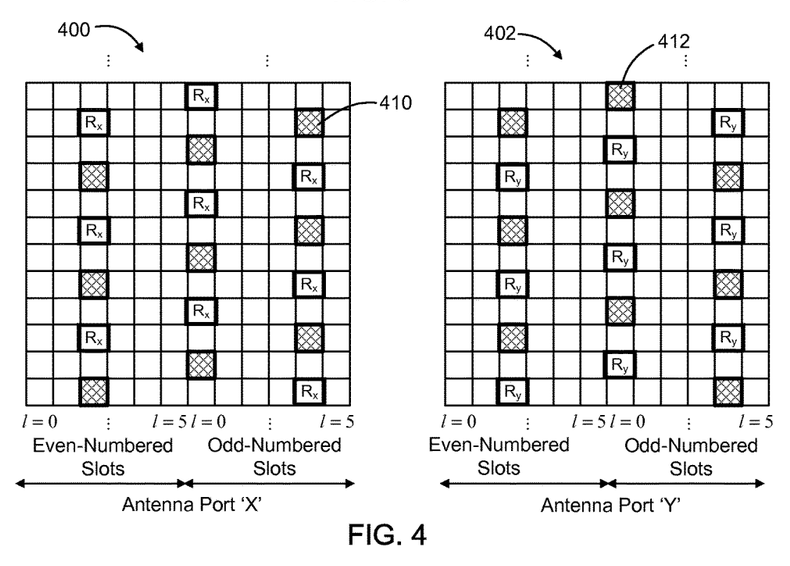
FIG. 4 illustrates a mapping of reference signals in resource blocks corresponding to two antenna ports, respectively, according to one embodiment.

FIG. 4 illustrates a mapping of MBSFN reference signals in resource blocks 400, 402 corresponding to two antenna ports, respectively, according to one embodiment. As in FIG. 3, the example shown in FIG. 4 corresponds to using an extended cyclic prefix and subcarrier spacing $\Delta f=15$ kHz. In FIG. 4, "$R_x$" indicates the resource blocks assigned to MBSFN references signals for antenna port X, and "$R_y$" indicates the resource blocks assigned to MBSFN references signals for antenna port Y. Using the same pattern of assigned resource elements, half of the MBSFN reference signals $R_4$ shown in FIG. 3 are assigned as MBSFN reference signals $R_x$ in the resource block 400 for antenna X in FIG. 4, and the other half of the MBSFN reference signals $R_4$ shown in FIG. 3 are assigned as MBSFN reference signals $R_y$ in the resource block 402 for antenna Y in FIG. 4.

The UE 122 is configured to use the MBSFN reference signals $R_x$ in the resource block 400 to estimate a channel for a first MIMO layer, and to use the MBSFN reference signals $R_y$ in the resource block 402 to estimate a channel for a second MIMO layer. The plurality of grayed out or hatched squares 410, 412 is resource elements that are assigned to MBSFN reference signals in the other antenna.

Figure 5:
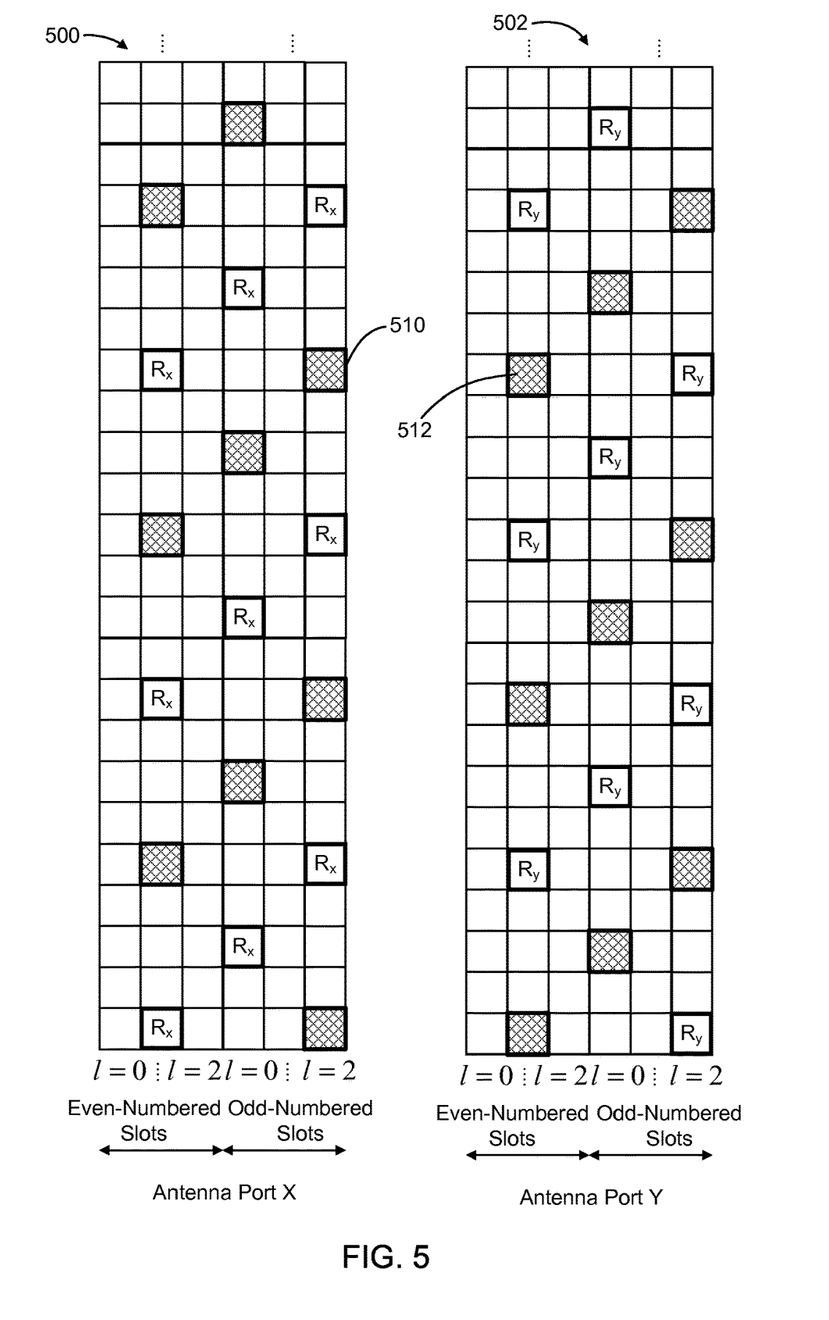
FIG. 5 illustrates a mapping of reference signals in resource blocks corresponding to two antenna ports, respectively, according to another embodiment.

FIG. 5 illustrates a mapping of MBSFN reference signals in resource blocks 500, 502 corresponding to two antenna ports, respectively, according to another embodiment. The example shown in FIG. 5 corresponds to using an extended cyclic prefix and subcarrier spacing $\Delta f=7.5$ kHz. Again, "$R_x$" indicates the resource blocks assigned to MBSFN references signals for antenna port X, and "$R_y$" indicates the resource blocks assigned to MBSFN references signals for antenna port Y. The UE 122 is configured to use the MBSFN reference signals $R_x$ in the resource block 500 to estimate a channel for a first MIMO layer, and to use the MBSFN reference signals $R_y$ in the resource block 502 to estimate a channel for a second MIMO layer. The plurality of grayed out or hatched squares 510, 512 is resource elements that are assigned to MBSFN reference signals in the other antenna.

In one example embodiment, the transmission of the PMCH using MIMO may be described as follows: The physical multicast channel is processed and mapped to resource elements as described in the LTE standard, with the following exceptions: in resource blocks in which enhanced MBSFN reference signals are transmitted, the PMCH is transmitted on antenna port(s) {X}, {Y}, {X,Y}; the PMCH may only be transmitted in the MBSFN region of an MBSFN subframe; and the PMCH is not mapped to resource elements used for transmission of MBSFN reference signals.

The extended cyclic prefix is used to accommodate the large propagation differences between signals received from different transmission points. In certain embodiments, however, small cell deployments may be used for MBSFN transmission where the typical large propagation differences are not observed. By way of example only, and not by limitation, a plurality of small cells may be deployed in a stadium and may be configured to provide MBSFN transmission (e.g., a video stream may be provided to a plurality of different UEs throughout the stadium). In such embodiments, overhead may be saved by reducing the cyclic prefix length (e.g., from extended to normal). The unused overhead may be used for additional OFDM signal transmission.

Figure 6:
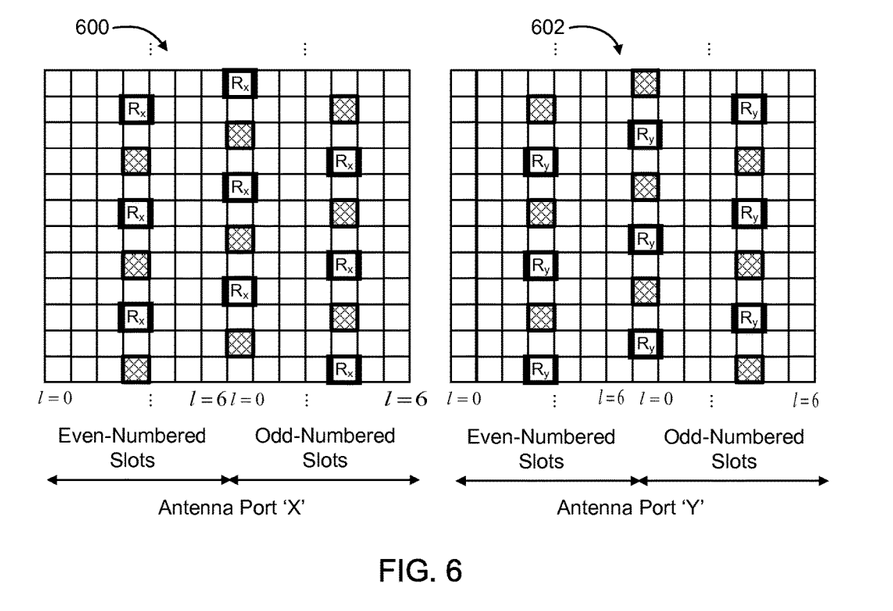
FIG. 6 illustrates a mapping of reference signals in resource blocks when a normal cyclic prefix length is used according to one embodiment.

Thus, in one embodiment, the normal cyclic prefix is selectively used for PMCH transmission. For example, FIG. 6 illustrates a mapping of MBSFN reference signals in resource blocks 600, 602 when a normal cyclic prefix length is used according to one embodiment. The example shown in FIG. 6 corresponds to using a normal cyclic prefix length and subcarrier spacing Δf=15 kHz. Again, "$R_x$" indicates the resource blocks assigned to MBSFN references signals for antenna port X, and "$R_y$" indicates the resource blocks assigned to MBSFN references signals for antenna port Y. Changing from the extended cyclic prefix to the normal cyclic prefix allows additional OFDM symbols for the PMCH transmission. Comparing FIG. 3 to FIG. 6, it is shown that the number of columns in the grid of resource elements increases by two additional OFDM symbols, which in FIG. 6 are shown at the beginning and end of the subframe. Thus, more resources may be allocated for the useful signal transmission.

In another embodiment the MBSFN reference signals may be further down-sampled in the frequency domain to reduce reference signals overhead, while keeping the nested structure.

Certain embodiments also provide for enhanced MCH BLER reporting. To assist MCS selection for PMCH, the UE reports the MCH BLER to the MCE 124. Previous systems defined MCH BLER assuming a single layer transmission. Generally, for example, multicast channel block error rate (MCH BLER) estimation is based on evaluating the cyclic redundancy check (CRC) of MCH transport blocks. The BLER is computed over the measurement period as the ratio between the number of received MCH transport blocks resulting in a CRC error and the total number of received MCH transport blocks of an MCH. The MCH BLER estimation may only consider MCH transport blocks using the same MCS.

To assist MCS selection on each MIMO layer, according to certain embodiments, the UE 122 reports BLER on each MIMO layer. When different codewords are provided to different MIMO layers, as shown in FIG. 2A, for example, the MCH BLER estimation is based on evaluating the CRC of MCH transport blocks within each layer or codeword. The BLER is computed over the measurement period as the ratio between the number of received MCH transport blocks resulting in a CRC error on a given layer or codeword and the total number of received MCH transport blocks of an MCH on a given layer or codeword. In certain embodiments the MCH BLER estimation only considers MCH transport blocks using the same MCS. Thus, the MCE 124 is able to understand the quality of the reception on different MIMO layers and is able to adjust MCS for each MIMO layer independently.

Figure 7:
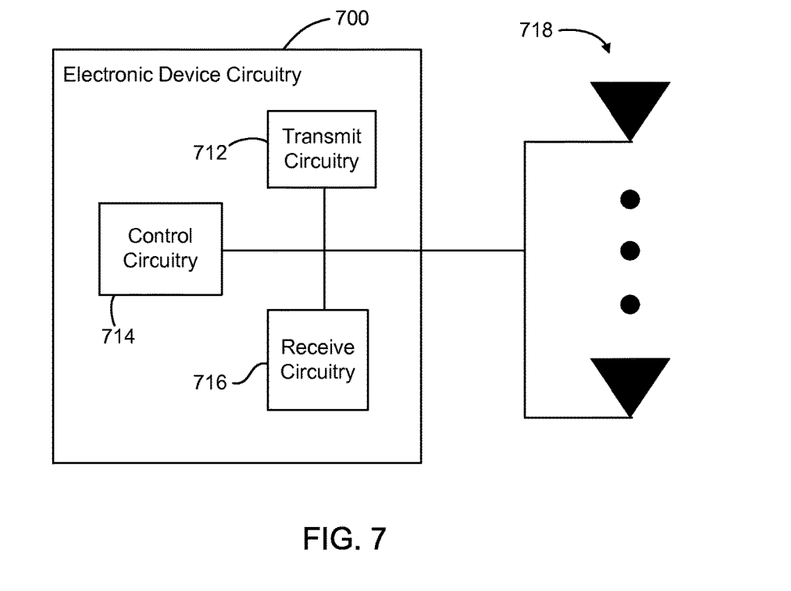
FIG. 7 illustrates an electronic device circuitry in accordance with various embodiments.

FIG. 7 illustrates an electronic device circuitry 700 that may be eNB circuitry, UE circuitry, or some other type of circuitry in accordance with various embodiments. In embodiments, the electronic device circuitry 700 may be, or may be incorporated into or otherwise a part of, an eNB, a UE, or some other type of electronic device. In embodiments, the electronic device circuitry 700 may include radio transmit circuitry 712 and receive circuitry 716 coupled to control circuitry 714. In embodiments, the transmit and/or receive circuitry 716 may be elements or modules of transceiver circuitry, as shown. The electronic device circuitry 700 may be coupled with one or more plurality of antenna elements of one or more antennas 718. The electronic device circuitry 700 and/or the components of the electronic device circuitry 700 may be configured to perform operations similar to those described elsewhere in this disclosure.

In embodiments where the electronic device is an eNB or is incorporated into or otherwise part of an eNB, the control circuitry 714 may be to identify one or more physical multicast channel (PMCH) transmission parameters related to at least one PMCH transmission, wherein the one or more transmission parameters were previously supplied to a user equipment (UE) via higher layer configuration. The transmit circuitry 712 may be to transmit the at least one PMCH transmission on at least two spatial layers. The receive circuitry 716 may be to receive, based on the at least one PMCH transmission, a measurement related to the at least two spatial layers.

Additionally or alternatively, in embodiments where the electronic device is an eNB or is incorporated into or otherwise part of an eNB, the control circuitry 714 may be to identify a type of cyclic prefix with a length, wherein the type of cyclic prefix is associated with a physical multicast channel (PMCH) transmission and is identified from a plurality of types of cyclic prefix that includes at least a normal cyclic prefix that has a normal cyclic prefix length. The transmit circuitry 712 may be to transmit the PMCH transmission with the length.

In embodiments where the electronic device is a UE or is incorporated into or otherwise part of a UE, the receive circuitry 716 may be to receive, via higher layer signaling, configuration information related to physical multicast channel (PMCH) parameters of a PMCH transmission. The receive circuitry 716 may be further to receive the PMCH transmission on at least two spatial layers of a multicast channel, wherein the PMCH transmission is based on the PMCH parameters. The control circuitry 714 may be to measure one or more characteristics of the PMCH transmission. The transmit circuitry 712 may be to transmit an indication of the measurement.

Additionally or alternatively, in embodiments where the electronic device is a UE or is incorporated into or otherwise part of a UE the control circuitry 714 may be to identify a higher layer configuration of a type of a cyclic prefix associated with a physical multicast channel (PMCH) transmission, wherein the identified type of cyclic prefix has a length and is identified from a plurality of types of cyclic prefix that includes at least a normal cyclic prefix that has a normal cyclic prefix length. The receive circuitry 716 may be to receive a transmission of the PMCH from an evolved NodeB (eNB) using the identified type of cyclic prefix and the associated length of the identified type of cyclic prefix.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry 700 may be implemented in, or functions associated with the circuitry may be implemented by, one or more software or firmware modules.

Figure 8:
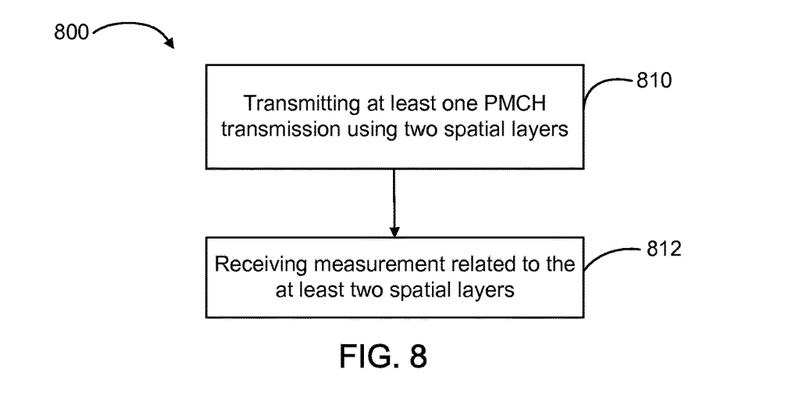
FIG. 8 is a flow chart of a process of physical multicast channel transmission using at least two spatial layers according to one embodiment.

The electronic device circuitry 700 of FIG. 7 may be configured to perform one or more processes such as the process 800 of physical multicast channel (PMCH) transmission using at least two spatial layers depicted in FIG. 8. For example, in embodiments where the electronic device circuitry is an eNB or is part of or otherwise incorporated into an eNB, the process 800 may include transmitting 810 at least one PMCH transmission using the at least two spatial layers, wherein the transmitting is based on PMCH parameters related to multi-layer transmission, and wherein the PMCH parameters were previously supplied to a user equipment (UE) via higher layer configuration. The process 800 may further include receiving 812, based on the PMCH transmission, a measurement related to the at least two spatial layers.

Figure 9:
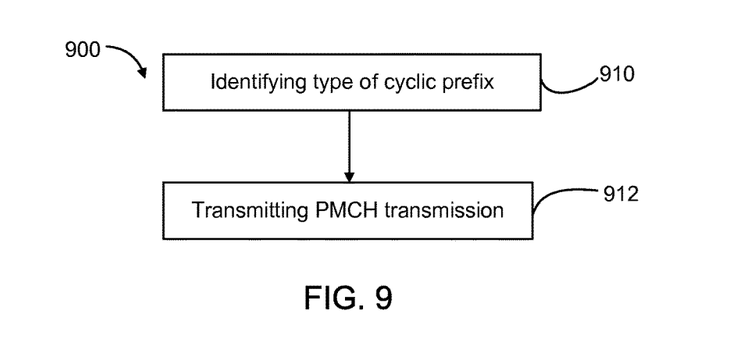
FIG. 9 is a flow chart of a process of physical multicast channel transmission according to another embodiment.

The electronic device circuitry 700 of FIG. 7 may be configured to perform one or more processes such as the process 900 of physical multicast channel (PMCH) transmission depicted in FIG. 9. For example, in embodiments where the electronic device circuitry is an eNB or is part of or otherwise incorporated into an eNB, the process 900 may include identifying a type of cyclic prefix associated with the PMCH transmission from a plurality of types of cyclic prefix, wherein the identified type of cyclic prefix has a length. The process 900 may further include transmitting 912 the PMCH transmission using the length.

Figure 10:
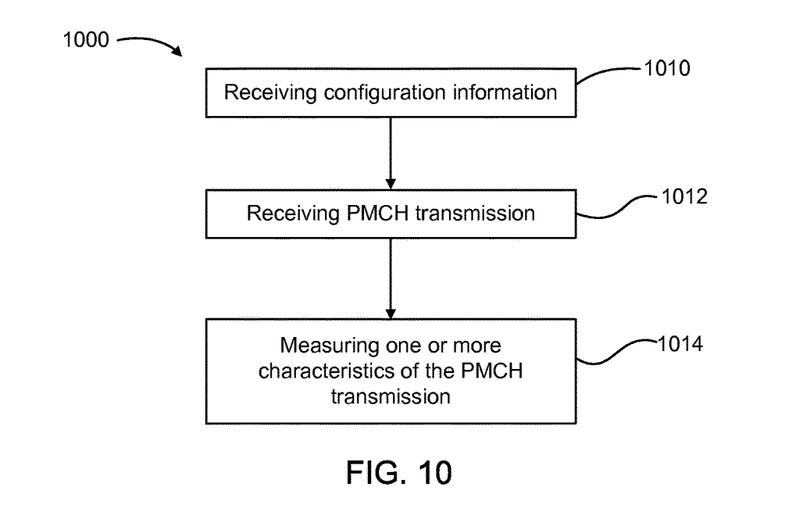
FIG. 10 is a flow chart of a process of physical multicast channel transmission using at least two spatial layers according to another embodiment.

The electronic device circuitry 700 of FIG. 7 may be configured to perform one or more processes such as the process 1000 of physical multicast channel (PMCH) transmission using at least two spatial layers depicted in FIG. 10. For example, in embodiments where the electronic device circuitry is a UE or is part of or otherwise incorporated into a UE, the process 1000 may include receiving 1010, via higher layer signaling, configuration information related to PMCH parameters of a PMCH transmission. The process 1000 may further include receiving 1012 the PMCH transmission on at least two spatial layers of a multicast channel, wherein the PMCH transmission is based on the PMCH parameters. The process 1000 may further include measuring 1014 one or more characteristics of the PMCH transmission.

Figure 11:
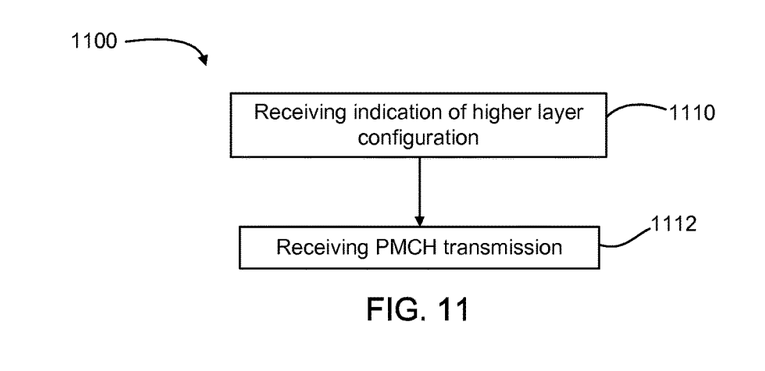
FIG. 11 is a flow chart of a process of physical multicast channel transmission using normal cyclic prefix length according to one embodiment.

The electronic device circuitry 700 of FIG. 7 may be configured to perform one or more processes such as the process 1100 of physical multicast channel (PMCH) transmission using normal cyclic prefix length depicted in FIG. 11. For example, in embodiments where the electronic device circuitry is a UE or is part of or otherwise incorporated into a UE, the process 1100 may include receiving 1110 an indication of a higher layer configuration of a type of cyclic prefix used for PMCH transmission. The process 1100 may further include receiving 1112 a transmission of the PMCH from an evolved NodeB (eNB) using cyclic prefix length indicated to the UE.

Figure 12:
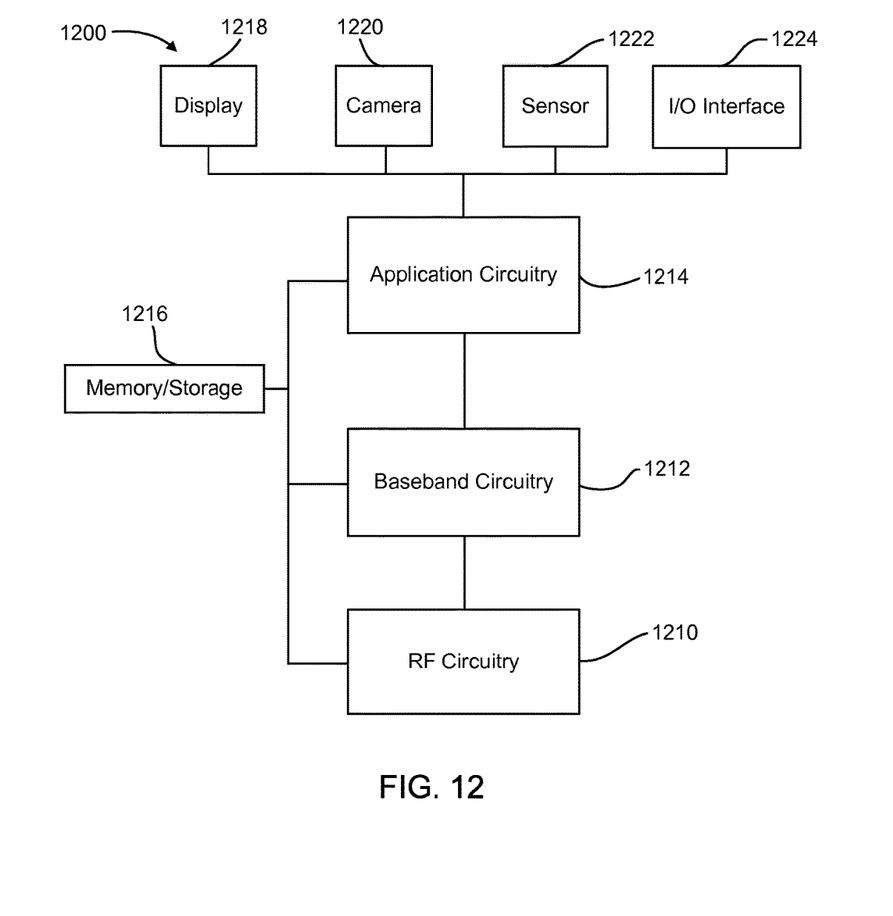
FIG. 12 is a block diagram illustrating an example system according to one embodiment.

Embodiments described herein may be implemented into a system using any suitably configured hardware and/or software. FIG. 12 illustrates, for one embodiment, an example system 1200 comprising radio frequency (RF) circuitry 1210, baseband circuitry 1212, application circuitry 1214, memory/storage 1216, display 1218, camera 1220, sensor 1222, and input/output (I/O) interface 1224, coupled with each other at least as shown.

The application circuitry 1214 may include circuitry such as, but not limited to, one or more single-core or multi-core processors. The processor(s) may include any combination of general purpose processors and dedicated processors (e.g., graphics processors, application processors, etc.). The processors may be coupled with memory/storage 1216 and configured to execute instructions stored in the memory/storage 1216 to enable various applications and/or operating systems running on the system 1200.

The baseband circuitry 1212 may include circuitry such as, but not limited to, one or more single-core or multi-core processors. The processor(s) may include a baseband processor. The baseband circuitry 1212 may handle various radio control functions that enables communication with one or more radio networks via the RF circuitry 1210. The radio control functions may include, but are not limited to, signal modulation, encoding, decoding, radio frequency shifting, etc. In some embodiments, the baseband circuitry 1212 may provide for communication compatible with one or more radio technologies. For example, in some embodiments, the baseband circuitry 1212 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1212 is configured to support radio communications of more than one wireless protocol may be referred to as multi-mode baseband circuitry.

In various embodiments, baseband circuitry 1212 may include circuitry to operate with signals that are not strictly considered as being in a baseband frequency. For example, in some embodiments, baseband circuitry 1212 may include circuitry to operate with signals having an intermediate frequency, which is between a baseband frequency and a radio frequency. RF circuitry 1210 may enable communication with wireless networks using modulated electromagnetic radiation through a non-solid medium. In various embodiments, the RF circuitry 1210 may include switches, filters, amplifiers, etc. to facilitate the communication with the wireless network.

In various embodiments, RF circuitry 1210 may include circuitry to operate with signals that are not strictly considered as being in a radio frequency. For example, in some embodiments, RF circuitry 1210 may include circuitry to operate with signals having an intermediate frequency, which is between a baseband frequency and a radio frequency.

In various embodiments, transmit circuitry, control circuitry, and/or receive circuitry discussed or described herein may be embodied in whole or in part in one or more of the RF circuitry 1210, the baseband circuitry 1212, and/or the application circuitry 1214. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry 1212, the application circuitry 1214, and/or the memory/storage 1216 may be implemented together on a system on a chip (SOC).

Memory/storage 1216 may be used to load and store data and/or instructions, for example, for system 1200. Memory/storage 1216 for one embodiment may include any combination of suitable volatile memory (e.g., dynamic random access memory (DRAM)) and/or non-volatile memory (e.g., Flash memory).

In various embodiments, the I/O interface 1224 may include one or more user interfaces designed to enable user interaction with the system 1200 and/or peripheral component interfaces designed to enable peripheral component interaction with the system 1200. User interfaces may include, but are not limited to a physical keyboard or keypad, a touchpad, a speaker, a microphone, etc. Peripheral component interfaces may include, but are not limited to, a nonvolatile memory port, a universal serial bus (USB) port, an audio jack, and a power supply interface.

In various embodiments the sensor 1222 may include one or more sensing devices to determine environmental conditions and/or location information related to the system 1200.

In some embodiments, the sensors may include, but are not limited to, a gyro sensor, an accelerometer, a proximity sensor, an ambient light sensor, and a positioning unit. The positioning unit may also be part of, or interact with, the baseband circuitry 1212 and/or RF circuitry 1210 to communicate with components of a positioning network, e.g., a global positioning system (GPS) satellite.

In various embodiments, the display 1218 may include a display (e.g., a liquid crystal display, a touch screen display, etc.).

In various embodiments, the system 1200 may be a mobile computing device such as, but not limited to, a laptop computing device, a tablet computing device, a netbook, an ultrabook, a smartphone, etc. In various embodiments, the system 1200 may have more or less components, and/or different architectures.

Figure 13:
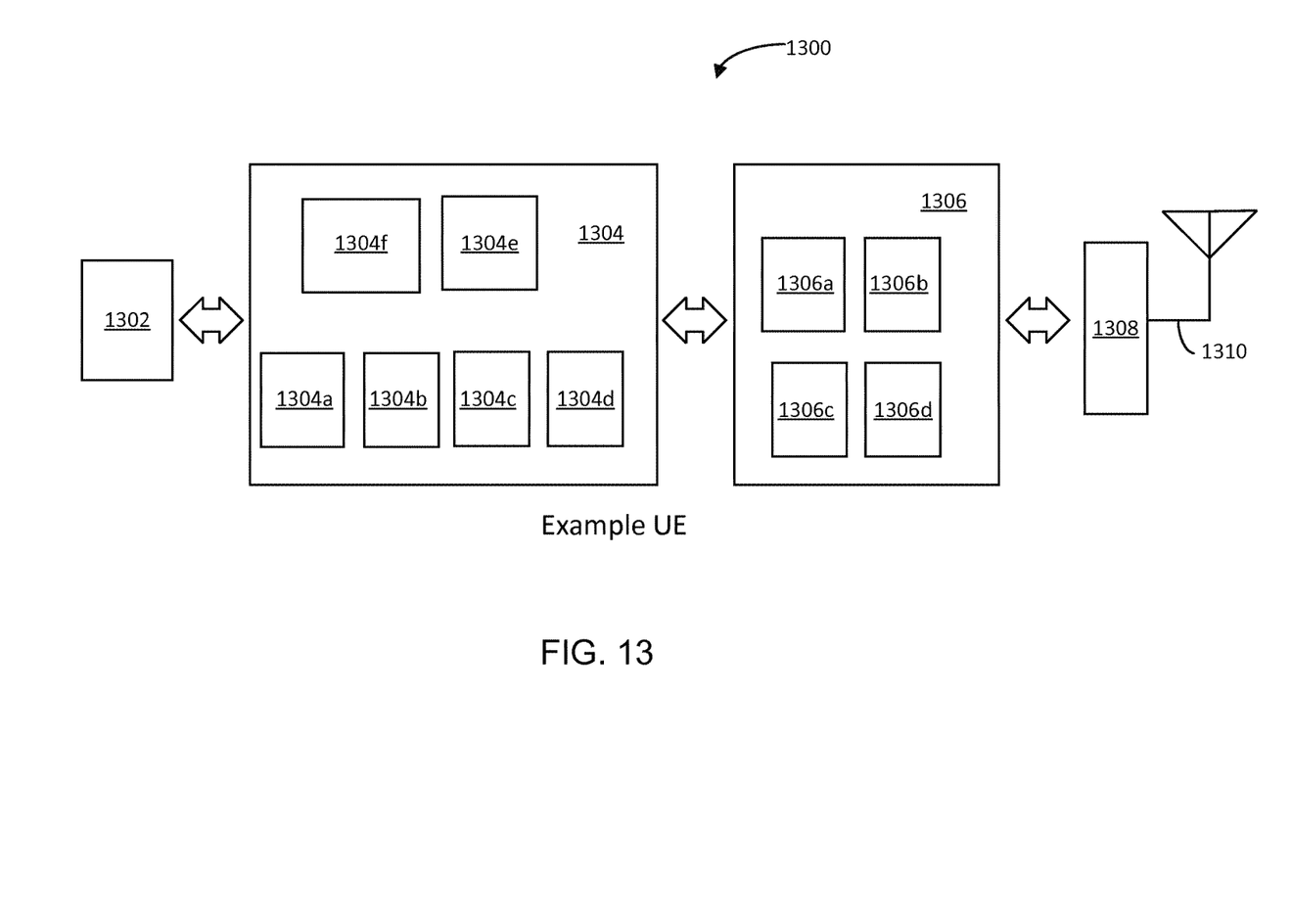
FIG. 13 illustrates, for one embodiment, example components of a user equipment device.

Embodiments described herein may be implemented into a system using any suitably configured hardware and/or software. FIG. 13 illustrates, for one embodiment, example components of a UE device 1300. In some embodiments, the UE device 1300 may include application circuitry 1302, baseband circuitry 1304, Radio Frequency (RF) circuitry 1306, front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304a, a third generation (3G) baseband processor 1304b, a fourth generation (4G) baseband processor 1304c, and/or other baseband processor(s) 1304d for other existing generations or generations in development or to be developed in the future (e.g., fifth generation (5G), 6G, etc.). The baseband circuitry 1304 (e.g., one or more of baseband processors 1304a-d) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP, and/or RRC layers. In some embodiments, the baseband circuitry 1304 may include one or more audio digital signal processor(s) (DSP) 1304f. The audio DSP(s) 1304f may include elements for compression/decompression and echo cancellation and may include other suitable processing elements in other embodiments. Components of the baseband circuitry 1304 may be suitably combined in a single chip or single chipset, or disposed on a same circuit board in some embodiments. In some embodiments, some or all of the constituent components of the baseband circuitry 1304 and the application circuitry 1302 may be implemented together, such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc., to facilitate the communication with the wireless network. RF circuitry 1306 may include a receive signal path, which may include circuitry to down-convert RF signals received from the FEM circuitry 1308 and provide baseband signals to the baseband circuitry 1304. RF circuitry 1306 may also include a transmit signal path, which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b, and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals, and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature downconversion and/or upconversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a of the transmit signal path may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 1306 may include analog-to-digital converter (ADC) and digital-to-analog converter (DAC) circuitry, and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect, as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the application circuitry 1302, depending on the desired output frequency. In some embodiments, a divider control input (e.g., N) may be determined from a look-up table based on a channel indicated by the application circuitry 1302.

Synthesizer circuitry 1306d of the RF circuitry 1306 may include a divider, a delay-locked loop (DLL), a multiplexer, and a phase accumulator. In some embodiments, the divider may be a dual modulus divider (DMD), and the phase accumulator may be a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path, which may include circuitry configured to operate on RF signals received from one or more antennas 1310, amplify the received signals, and provide the amplified versions of the received signals to the RF circuitry 1306 for further processing. FEM circuitry 1308 may also include a transmit signal path, which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The receive signal path of the FEM circuitry 1308 may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the UE device 1300 may include additional elements, such as, for example, memory/storage, a display, a camera, a sensor, and/or an input/output (I/O) interface.

EXAMPLES

The following examples pertain to further embodiments.

Example 1 is a user equipment (UE) including processing circuitry and a receiver to receive a physical multicast channel (PMCH) transmission through a plurality of spatial layers. The processing circuitry is configured to configure PMCH parameters indicated by a network node, and process the PMCH transmission, for the plurality of spatial layers, using the configured PMCH parameters to obtain multicast channel transport blocks. The processing circuitry is also configured to report a measured block error rate of the multicast channel transport blocks.

Example 2 includes the UE of Example 1, wherein the processing circuitry is further configured to process enhanced multicast broadcast single frequency network (eMBSFN) reference signals supporting at least two antenna ports.

Example 3 includes the UE of Example 2, wherein resource elements of the eMBSFN reference signals for the two antenna ports occupy at least a subset of corresponding resource elements for a single antenna port transmission of multicast broadcast single frequency network (MBSFN) reference signals.

Example 4 includes the UE of Example 3, wherein the single antenna port comprises antenna port 4 of a third generation partnership project (3GPP) long term evolution (LTE) evolved universal terrestrial radio access network (E-UTRAN) Node B (eNB).

Example 5 includes the UE of any of Examples 1-4, wherein different codewords are mapped to two or more spatial layers of the plurality of spatial layers, and wherein the processing circuitry is further configured to process a PMCH configuration message comprising separate sets of PMCH parameters for the two or more spatial layers.

Example 6 includes the UE of Example 5, wherein the processing circuitry is further configured to determine a total number of the plurality of spatial layers for the PMCH transmission based on a total number of the sets of PMCH parameters included in the PMCH configuration message.

Example 7 includes the UE of Example 5, wherein the processing circuitry is further configured to report independent multicast channel block error rates for the two or more spatial layers.

Example 8 includes the UE of any of Examples 1-7, wherein a single codeword is mapped to two or more spatial layers of the plurality of spatial layers, and wherein the processing circuitry is further configured to process a PMCH configuration message comprising a single set of PMCH parameters for the two or more spatial layers.

Example 9 includes the UE of Example 8, wherein the PMCH configuration message indicates a total number of the plurality of spatial layers for the PMCH transmission.

Example 10 includes the UE of Example 8, wherein the processing circuitry is further configured to report a single multicast channel block error rate for the two or more spatial layers.

Example 11 includes the UE of any of Examples 1-10, wherein the network node comprises a multicast coordination entity (MCE) configured to select a transport block size (TBS) and a modulation and coding scheme (MCS) based on the measured block error rate, and wherein the processing circuitry receives a PMCH configuration message indicating the selected TBS and MCS in a radio resource control (RRC) signal received from a base station.

Example 12 includes the UE of any of Examples 1-11, wherein the UE comprises at least one of a speaker, a microphone, a connection port, a keyboard, a touch screen, a battery, a memory port, and one or more antennas.

Example 13 is an evolved universal terrestrial radio access network (E-UTRAN) Node B (eNB) that includes an antenna array including a plurality of transmit antennas, a transmitter operatively coupled to the antenna array, and a processor to provide multimedia broadcast multicast service (MBMS) using multiple-input multiple-output (MIMO) communication through the transmitter. The processor is configured to receive, from a multicast coordination entity (MCE), a transport block size (TBS) and a modulation and coding scheme (MCS). The processor is also configured to send, to one or more mobile communication devices, a configuration message including the TBS and the MCS, and transmit a physical multicast channel, based on the TBS and the MCS, through at least two antenna ports of the antenna array.

Example 14 includes the eNB of Example 13, wherein the processor is configured to map enhanced multicast broadcast single frequency network (eMBSFN) reference signals between the at least two antenna ports.

Example 15 includes the eNB of Example 14, wherein the processor is configured to map the eMBSFN reference signals to resource elements for the two antenna ports that occupy at least a subset of corresponding resource elements for a single antenna port transmission of multicast broadcast single frequency network (MBSFN) reference signals.

Example 16 includes the eNB of Example 15, wherein the single antenna port comprises antenna port 4.

Example 17 includes the eNB of any of Examples 13-16, wherein the processor is configured to map different codewords to two or more MIMO layers, and wherein the processor is further configured to include separate sets of the TBS and the MCS for the two or more MIMO layers in the configuration message.

Example 18 includes the eNB of Example 17, wherein the processor is further configured to receive independent multicast channel block error rate (MCH BLER) reports for the two or more MIMO layers, and to provide the independent MCH BLER reports to the MCE to assist with subsequent selection of the TBS and the MCS.

Example 19 includes the eNB of any of Examples 13-18, wherein the processor is configured to map a single codeword to two or more MIMO layers, and wherein the processor is further configured to include a single set of the TBS and the MCS for the two or more MIMO layers in the configuration message.

Example 20 includes the eNB of Example 19, wherein the processor is further configured to include a total number of the plurality of MIMO layers for the MBMS in the configuration message.

Example 21 includes the eNB of Example 19, wherein the processor is further configured to receive a single multicast channel block error rate (MCH BLER) report for the two or more MIMO layers, and to provide the single MCH BLER report to the MCE to assist with subsequent selection of the TBS and the MCS.

Example 22 includes the eNB of any of Examples 13-21, wherein the processor is configured to send the configuration message in a radio resource control (RRC) signal to the one or more communication devices.

Example 23 includes at least one computer-readable storage medium having stored thereon instructions that, when executed by one or more processors, cause the one or more processors to perform operations comprising: select a type of cyclic prefix for physical multicast channel transmission; signal, at a higher layer than a physical layer in a communication protocol hierarchy, configuration information including the selected type of cyclic prefix; and transmit the physical multicast channel transmission with a cyclic prefix length corresponding to the selected prefix type.

Example 24 includes the at least one computer-readable storage medium of Example 23, wherein the type of cyclic prefix is selected from a group comprising a normal cyclic prefix length and an extended cyclic prefix length.

Example 25 includes the at least one computer-readable storage medium of Example 24, further comprising mapping enhanced multicast broadcast single frequency network (eMBSFN) reference signals between at least two antenna ports, wherein the mapped eMBSFN reference signals occupy at least a subset of corresponding resource elements for a single antenna port transmission of multicast broadcast single frequency network (MBSFN) reference signals.

Example 26 is a method that includes receiving a physical multicast channel (PMCH) transmission through a plurality of spatial layers, configuring PMCH parameters indicated by a network node, processing the PMCH transmission, for the plurality of spatial layers, using the configured PMCH parameters to obtain multicast channel transport blocks, and reporting a measured block error rate of the multicast channel transport blocks.

Example 27 includes the method of Example 26, further comprising processing enhanced multicast broadcast single frequency network (eMBSFN) reference signals supporting at least two antenna ports.

Example 28 includes the method of Example 27, wherein resource elements of the eMBSFN reference signals for the two antenna ports occupy at least a subset of corresponding resource elements for a single antenna port transmission of multicast broadcast single frequency network (MBSFN) reference signals.

Example 29 includes the method of Example 28, wherein the single antenna port comprises antenna port 4 of a third generation partnership project (3GPP) long term evolution (LTE) evolved universal terrestrial radio access network (E-UTRAN) Node B (eNB).

Example 30 includes the method of any of Examples 26-29, wherein different codewords are mapped to two or more spatial layers of the plurality of spatial layers, and wherein the method further comprises processing a PMCH configuration message comprising separate sets of PMCH parameters for the two or more spatial layers.

Example 31 includes the method of Example 30, further comprising determining a total number of the plurality of spatial layers for the PMCH transmission based on a total number of the sets of PMCH parameters included in the PMCH configuration message.

Example 32 includes the method of Example 30, further comprising reporting independent multicast channel block error rates for the two or more spatial layers.

Example 33 includes the method of any of Examples 26-32, wherein a single codeword is mapped to two or more spatial layers of the plurality of spatial layers, and wherein the method further comprises processing a PMCH configuration message comprising a single set of PMCH parameters for the two or more spatial layers.

Example 34 includes the method of Example 33, wherein the PMCH configuration message indicates a total number of the plurality of spatial layers for the PMCH transmission.

Example 35 includes the method of Example 33, further comprising reporting a single multicast channel block error rate for the two or more spatial layers.

Example 36 includes the method of any of Examples 26-35, wherein the network node comprises a multicast coordination entity (MCE) configured to select a transport block size (TBS) and a modulation and coding scheme (MCS) based on the measured block error rate, and wherein the method further comprises receiving a PMCH configuration message indicating the selected TBS and MCS in a radio resource control (RRC) signal received from a base station.

Example 37 is a method to provide multimedia broadcast multicast service (MBMS) using multiple-input multiple-output (MIMO) communication. The method comprises: receiving, from a multicast coordination entity (MCE), a transport block size (TBS) and a modulation and coding scheme (MCS); sending, to one or more mobile communication devices, a configuration message including the TBS and the MCS; and transmitting a physical multicast channel, based on the TBS and the MCS, through at least two antenna ports of an antenna array.

Example 38 includes the method of Example 37, further comprising mapping enhanced multicast broadcast single frequency network (eMBSFN) reference signals between the at least two antenna ports.

Example 39 includes the method of Example 38, further comprising mapping the eMBSFN reference signals to resource elements for the two antenna ports that occupy at least a subset of corresponding resource elements for a single antenna port transmission of multicast broadcast single frequency network (MBSFN) reference signals.

Example 40 includes the method of Example 39, wherein the single antenna port comprises antenna port 4.

Example 41 includes the method of any of Examples 37-40, further comprising mapping different codewords to two or more MIMO layers, and wherein the method further comprises including separate sets of the TBS and the MCS for the two or more MIMO layers in the configuration message.

Example 42 includes the method of Example 41, further comprising receiving independent multicast channel block error rate (MCH BLER) reports for the two or more MIMO layers, and providing the independent MCH BLER reports to the MCE to assist with subsequent selection of the TBS and the MCS.

Example 43 includes the method of any of Examples 37-42, further comprising mapping a single codeword to two or more MIMO layers, and including a single set of the TBS and the MCS for the two or more MIMO layers in the configuration message.

Example 44 includes the method of Example 43, further comprising including a total number of the plurality of MIMO layers for the MBMS in the configuration message.

Example 45 includes the method of Example 43, further comprising receiving a single multicast channel block error rate (MCH BLER) report for the two or more MIMO layers, and providing the single MCH BLER report to the MCE to assist with subsequent selection of the TBS and the MCS.

Example 46 includes the method of any of Examples 37-45, further comprising sending the configuration message in a radio resource control (RRC) signal to the one or more communication devices.

Example 47 is a method comprising: selecting a type of cyclic prefix for physical multicast channel transmission; signaling, at a higher layer than a physical layer in a communication protocol hierarchy, configuration information including the selected type of cyclic prefix; and transmitting the physical multicast channel transmission with a cyclic prefix length corresponding to the selected prefix type.

Example 48 includes the method of Example 23, wherein the type of cyclic prefix is selected from a group comprising a normal cyclic prefix length and an extended cyclic prefix length.

Example 49 includes the method of Example 48, further comprising mapping enhanced multicast broadcast single frequency network (eMBSFN) reference signals between at least two antenna ports, wherein the mapped eMBSFN reference signals occupy at least a subset of corresponding resource elements for a single antenna port transmission of multicast broadcast single frequency network (MBSFN) reference signals.

Example 50 is an apparatus comprising means to perform a method as recited in any of Examples 26-49.

Example 51 is at least one computer-readable storage medium having stored thereon computer-readable instructions, when executed, to implement a method as recited in any of Example 26-49.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The computing device may include a computer-readable storage device such as non-volatile memory, static random access memory (RAM), dynamic RAM, read-only memory (ROM), disk, tape, magnetic, optical, flash memory, or other computer-readable storage medium.

Various aspects of certain embodiments may be implemented using hardware, software, firmware, or a combination thereof. A component or module may refer to, be part of, or include an application specific integrated circuit (ASIC), an electronic circuit, a processor (shared, dedicated, or group), and/or memory (shared, dedicated or group) that execute one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE), comprising:
   a receiver to receive a physical multicast channel (PMCH) transmission through a plurality of spatial layers, wherein different codewords are mapped to two or more spatial layers of the plurality of spatial layers; and
   processing circuitry to:
      configure PMCH parameters indicated by a network node;
      process the PMCH transmission, for the plurality of spatial layers, using the configured PMCH parameters to obtain multicast channel transport blocks;
      report a measured block error rate of the multicast channel transport blocks; and
      process a PMCH configuration message comprising separate sets of PMCH parameters for the two or more spatial layers.

2. The UE of claim 1, wherein the processing circuitry is further configured to process enhanced multicast broadcast single frequency network (eMBSFN) reference signals supporting at least two antenna ports.

3. The UE of claim 2, wherein resource elements of the eMBSFN reference signals for the two antenna ports occupy at least a subset of corresponding resource elements for a single antenna port transmission of multicast broadcast single frequency network (MBSFN) reference signals.

4. The UE of claim 3, wherein the single antenna port comprises antenna port 4 of a third generation partnership project (3GPP) long term evolution (LTE) evolved universal terrestrial radio access network (E-UTRAN) Node B (eNB).

5. The UE of claim 1, wherein the processing circuitry is further configured to determine a total number of the plurality of spatial layers for the PMCH transmission based on a total number of the sets of PMCH parameters included in the PMCH configuration message.

6. The UE of claim 1, wherein the processing circuitry is further configured to report independent multicast channel block error rates for the two or more spatial layers.

7. The UE of claim 1, wherein the network node comprises a multicast coordination entity (MCE) configured to select a transport block size (TBS) and a modulation and coding scheme (MCS) based on the measured block error rate, and wherein the processing circuitry receives a PMCH configuration message indicating the selected TBS and MCS in a radio resource control (RRC) signal received from a base station.

8. The UE of claim 1, wherein the UE comprises at least one of a speaker, a microphone, a connection port, a keyboard, a touch screen, a battery, a memory port, and one or more antennas.

9. An evolved universal terrestrial radio access network (E-UTRAN) Node B (eNB), the eNB comprising:
   an antenna array including a plurality of transmit antennas;
   a transmitter operatively coupled to the antenna array; and
   a processor to provide multimedia broadcast multicast service (MBMS) using multiple-input multiple-output (MIMO) communication through the transmitter, the processor configured to:
      receive, from a multicast coordination entity (MCE), a transport block size (TBS) and a modulation and coding scheme (MCS);
      map different codewords to two or more MIMO layers;
      include separate sets of the TBS and the MCS for the two or more MIMO layers in a configuration message;
      send, to one or more mobile communication devices, the configuration message; and
      transmit a physical multicast channel, based on the TBS and the MCS, through at least two antenna ports of the antenna array.

10. The eNB of claim 9, wherein the processor is configured to map enhanced multicast broadcast single frequency network (eMBSFN) reference signals between the at least two antenna ports.

11. The eNB of claim 10, wherein the processor is configured to map the eMBSFN reference signals to resource elements for the two antenna ports that occupy at least a subset of corresponding resource elements for a single antenna port transmission of multicast broadcast single frequency network (MBSFN) reference signals.

12. The eNB of claim 11, wherein the single antenna port comprises antenna port 4.

13. The eNB of claim 9, wherein the processor is further configured to receive independent multicast channel block error rate (MCH BLER) reports for the two or more MIMO layers, and to provide the independent MCH BLER reports to the MCE to assist with subsequent selection of the TBS and the MCS.

14. The eNB of claim 9, wherein the processor is configured to send the configuration message in a radio resource control (RRC) signal to the one or more communication devices.

15. A user equipment (UE), comprising:
a receiver to receive a physical multicast channel (PMCH) transmission through a plurality of spatial layers, wherein a single codeword is mapped to two or more spatial layers of the plurality of spatial layers; and
processing circuitry to:
configure PMCH parameters indicated by a network node;
process the PMCH transmission, for the plurality of spatial layers, using the configured PMCH parameters to obtain multicast channel transport blocks;
report a measured block error rate of the multicast channel transport blocks; and
process a PMCH configuration message comprising a single set of PMCH parameters for the two or more spatial layers.

16. The UE of claim 15, wherein the processing circuitry is further configured to process enhanced multicast broadcast single frequency network (eMBSFN) reference signals supporting at least two antenna ports.

17. The UE of claim 16, wherein resource elements of the eMBSFN reference signals for the two antenna ports occupy at least a subset of corresponding resource elements for a single antenna port transmission of multicast broadcast single frequency network (MBSFN) reference signals.

18. The UE of claim 17, wherein the single antenna port comprises antenna port 4 of a third generation partnership project (3GPP) long term evolution (LTE) evolved universal terrestrial radio access network (E-UTRAN) Node B (eNB).

19. The UE of claim 15, wherein the PMCH configuration message indicates a total number of the plurality of spatial layers for the PMCH transmission.

20. The UE of claim 15, wherein the processing circuitry is further configured to report a single multicast channel block error rate for the two or more spatial layers.

21. The UE of claim 15, wherein the network node comprises a multicast coordination entity (MCE) configured to select a transport block size (TBS) and a modulation and coding scheme (MCS) based on the measured block error rate, and wherein the processing circuitry receives a PMCH configuration message indicating the selected TBS and MCS in a radio resource control (RRC) signal received from a base station.

22. An evolved universal terrestrial radio access network (E-UTRAN) Node B (eNB), the eNB comprising:
an antenna array including a plurality of transmit antennas;
a transmitter operatively coupled to the antenna array; and
a processor to provide multimedia broadcast multicast service (MBMS) using multiple-input multiple-output (MIMO) communication through the transmitter, the processor configured to:
receive, from a multicast coordination entity (MCE), a transport block size (TBS) and a modulation and coding scheme (MCS);
map single codeword to two or more MIMO layers;
include a single set of the TBS and the MCS for the two or more MIMO layers in a configuration message;
send, to one or more mobile communication devices, the configuration message; and
transmit a physical multicast channel, based on the TBS and the MCS, through at least two antenna ports of the antenna array.

23. The eNB of claim 22, wherein the processor is configured to map enhanced multicast broadcast single frequency network (eMBSFN) reference signals between the at least two antenna ports.

24. The eNB of claim 23, wherein the processor is configured to map the eMBSFN reference signals to resource elements for the two antenna ports that occupy at least a subset of corresponding resource elements for a single antenna port transmission of multicast broadcast single frequency network (MBSFN) reference signals.

25. The eNB of claim 22, wherein the processor is further configured to include a total number of the plurality of MIMO layers for the MBMS in the configuration message.

26. The eNB of claim 22, wherein the processor is further configured to receive a single multicast channel block error rate (MCH BLER) report for the two or more MIMO layers, and to provide the single MCH BLER report to the MCE to assist with subsequent selection of the TBS and the MCS.

* * * * *